US012578996B2

(12) United States Patent
Lv et al.

(10) Patent No.: US 12,578,996 B2
(45) Date of Patent: Mar. 17, 2026

(54) ADAPTIVE HIGH-PERFORMANCE TASK DISTRIBUTION FOR MANAGING COMPUTING RESOURCES ON CLOUD

(71) Applicant: SAP SE, Walldorf (DE)

(72) Inventors: Fu-qiang Lv, Xi'an (CN); Jing He, Xi'an (CN); Haotian Zhou, Xi'an (CN)

(73) Assignee: SAP SE, Walldorf (DE)

( * ) Notice: Subject to any disclaimer, the term of this patent is extended or adjusted under 35 U.S.C. 154(b) by 567 days.

(21) Appl. No.: 17/454,088

(22) Filed: Nov. 9, 2021

(65) Prior Publication Data

US 2023/0205583 A1 Jun. 29, 2023

(51) Int. Cl.
*G06F 9/48* (2006.01)

(52) U.S. Cl.
CPC .......... *G06F 9/4887* (2013.01); *G06F 9/4837* (2013.01)

(58) Field of Classification Search
CPC .............................. G06F 9/4887; G06F 9/4837
See application file for complete search history.

(56) References Cited

U.S. PATENT DOCUMENTS

| | | | | |
|---|---|---|---|---|
| 2014/0215487 A1* | 7/2014 | Cherkasova | .......... | G06F 9/5066 |
| | | | | 718/106 |
| 2017/0017521 A1* | 1/2017 | Gupta | .................. | G06F 9/5016 |
| 2017/0269964 A1* | 9/2017 | Ashbaugh | ............. | G06F 9/3888 |
| 2017/0357530 A1* | 12/2017 | Shih | ........................... | G06F 9/50 |
| 2018/0210763 A1* | 7/2018 | Kumar | ................. | G06F 9/5077 |
| 2018/0270164 A1* | 9/2018 | Ahmed | ............. | G06F 16/24568 |

* cited by examiner

*Primary Examiner* — Kevin L Young
*Assistant Examiner* — Carina Yun
(74) *Attorney, Agent, or Firm* — Fish & Richardson P.C.

(57) ABSTRACT

Methods, systems, and computer-readable storage media for determining a set of estimated task execution times based on a set of task execution times, each estimated task execution time being calculated for a computing resource size that is different than a computing resource size of a corresponding task execution time in the set of task execution times, assigning a tag to each task in the set of tasks, each tag indicating a computing resource size that the respective tasks is to be executed by, providing the set of tasks and assigned tags for execution of the set of tasks in an iteration within the cloud system, and receiving actual task execution times from computing resources, each actual task execution time indicating an actual time required by a respective computing resource to execute a respective task.

20 Claims, 6 Drawing Sheets

ADAPTIVE HIGH-PERFORMANCE TASK DISTRIBUTION FOR MANAGING COMPUTING RESOURCES ON CLOUD

BACKGROUND

Enterprises use software systems to support operations. For example, enterprises can use enterprise resource planning (ERP) application, a customer relationship management (CRM) application, and a human capital management (HCM) application to perform tasks in support of operations of an enterprise. In many instances, software systems are deployed to cloud computing infrastructures, also referred to herein as cloud systems, from which enterprises can access and interact with the software systems. Cloud computing can be described as Internet-based computing that provides shared computer processing resources, and data to computers and other devices on demand.

Distribution of tasks to computing resources can result in inefficiencies within the cloud system. For example, for a workload, tasks that are distributed across computing resources should be completed at substantially the same time. Absent this, the workload is delayed, which reflects poor performance of the software system. That is, in such cases, the distribution of tasks is inefficient resulting in poor performance of the software system overall. Further, while cloud systems can scale-up (increase) computing resources to handle heavier workloads, scaling has limitations (i.e., is not infinite). Consequently, inefficient distribution of tasks can result in inefficient use of computing resources, which can result in scaling that would not otherwise be required.

SUMMARY

Implementations of the present disclosure are directed to managing computing resources in cloud systems. More particularly, implementations of the present disclosure are directed to an adaptive high-performance task distribution for efficient management of computing resources in cloud systems.

In some implementations, actions include receiving, by a tag processor executed within the cloud system, a set of task execution times, each task execution time corresponding to a task and computing resource pair, each task and computing resource pair representing a computing resource size in a set of computing resource sizes, each computing resource size in the set of computing resource sizes including a number of CPU cores and a size of memory, determining, by the tag processor, a set of estimated task execution times based on the set of task execution times, each estimated task execution time being calculated for a computing resource size that is different than a computing resource size of a corresponding task execution time in the set of task execution times, assigning, by the tag processor, a tag to each task in the set of tasks, each tag indicating a computing resource size that the respective tasks is to be executed by, providing, by the tag processor, the set of tasks and assigned tags to a task scheduler for execution of the set of tasks in an iteration within the cloud system, and receiving, by the tag processor, actual task execution times from computing resources, each actual task execution time indicating an actual time required by a respective computing resource to execute a respective task. Other implementations of this aspect include corresponding systems, apparatus, and computer programs, configured to perform the actions of the methods, encoded on computer storage devices.

These and other implementations can each optionally include one or more of the following features: actions further include determining, by the tag processor, a set of updated estimated task execution times based on the set of task execution times and the actual task execution times, assigning, by the tag processor, a tag to each task in the set of tasks based on the set of updated estimated task execution times, and providing, by the tag processor, the set of tasks and assigned tags to the task scheduler for execution of the set of tasks in a subsequent iteration within the cloud system; determining a set of estimated task execution times based on the set of task execution times includes determining a scaling factor to be applied to a task execution time in the set of task execution times, the task execution time being multiplied by the scaling factor to determine an estimated task execution time in the set of estimated task execution times; the scaling factor is based on a computing resource size that the estimated task execution time is calculated for; the scaling factor is greater than or equal to 1; tags are assigned to minimize a difference between a first completion time corresponding to a first computing resource and a last completion time corresponding to a second computing resource; and actions further include determining that a first completion time corresponding to a first computing resource and a last completion time corresponding to a second computing resource are within a threshold time of each other and, in response, foregoing updating of estimated task execution times in a subsequent iteration of execution of the set of tasks.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
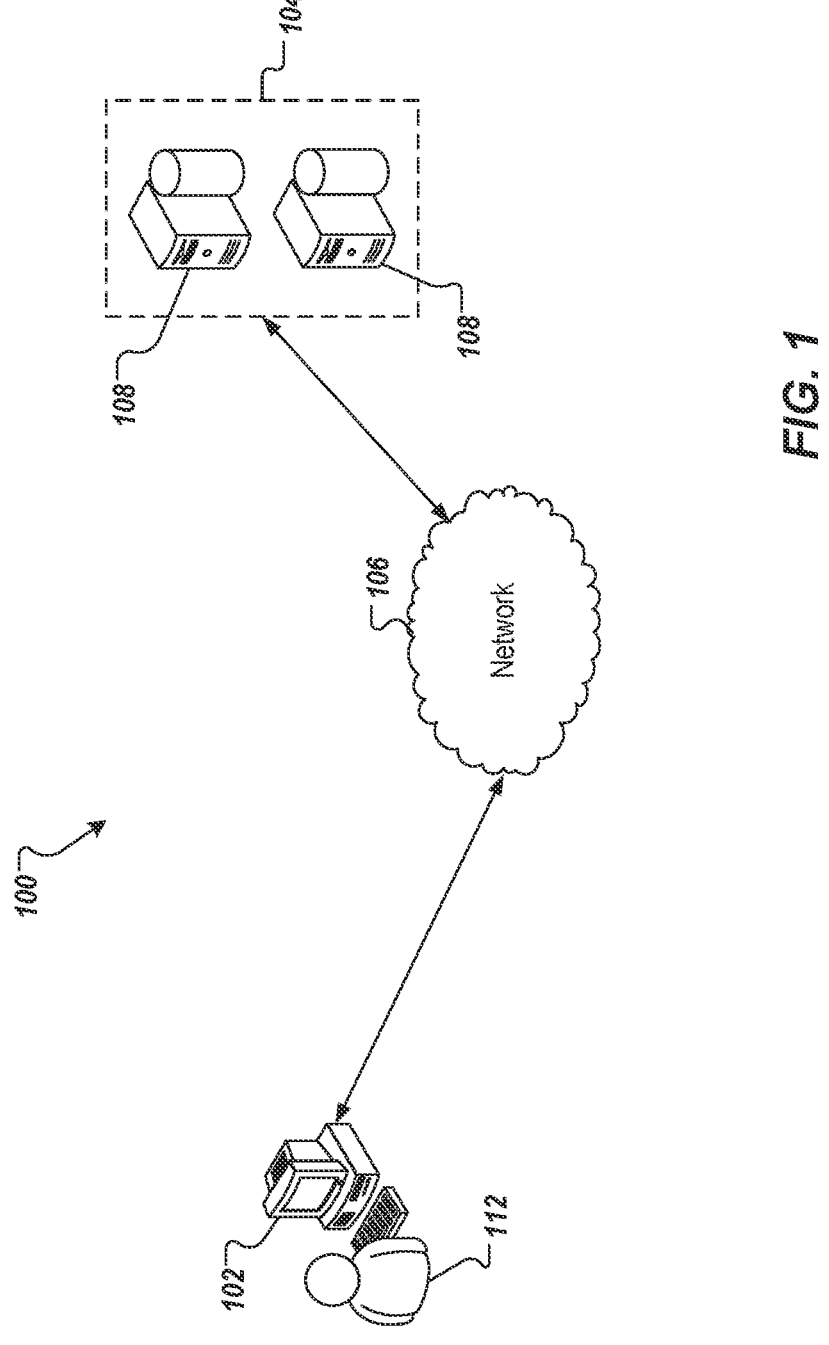
FIG. 1 depicts an example architecture that can be used to execute implementations of the present disclosure.

Implementations of the present disclosure are directed to managing computing resources in cloud systems. More particularly, implementations of the present disclosure are directed to an adaptive high-performance task distribution for efficient management of computing resources in cloud systems. Implementations can include actions of receiving, by a tag processor executed within the cloud system, a set of task execution times, each task execution time corresponding to a task and computing resource pair, each task and computing resource pair representing a computing resource size in a set of computing resource sizes, each computing resource size in the set of computing resource sizes including a number of CPU cores and a size of memory, determining, by the tag processor, a set of estimated task execution times based on the set of task execution times, each estimated task execution time being calculated for a computing resource size that is different than a computing resource size of a corresponding task execution time in the set of task execution times, assigning, by the tag processor, a tag to each task in the set of tasks, each tag indicating a computing resource size that the respective tasks is to be executed by, providing, by the tag processor, the set of tasks and assigned tags to a task scheduler for execution of the set of tasks in an iteration within the cloud system, and receiving, by the tag processor, actual task execution times from computing resources, each actual task execution time indicating an actual time required by a respective computing resource to execute a respective task.

To provide further context for implementations of the present disclosure, and as introduced above, enterprises use software systems to support operations. For example, enterprises can use enterprise resource planning (ERP) application, a customer relationship management (CRM) application, and a human capital management (HCM) application to perform tasks in support of operations of an enterprise. In many instances, software systems are deployed to cloud computing infrastructures, also referred to herein as cloud systems, from which enterprises can access and interact with the software systems. Cloud computing can be described as Internet-based computing that provides shared computer processing resources, and data to computers and other devices on demand.

In software systems, workloads are executed to provide some result. In some examples, a workload includes a set of tasks that are to be executed by computing resources of the cloud system. Each task can have a respective execution time, which is the time required to execute the task given constraints of the computing resource that is to execute the task. For example, a set of tasks can be provided for execution within the cloud system, and the execution time of each task depends on both the workload of the cloud system and the size of computing resource that is to execute the task. The software system may consume different sizes of computing resources or only a single size of computing resource.

Distribution of tasks to computing resources can result in inefficiencies within the cloud system. For example, for a workload, tasks that are distributed across computing resources should be completed at substantially the same time. Absent this, the workload is delayed waiting for task(s) to complete, which reflects poor performance of the software system. That is, in such cases, the distribution of tasks is inefficient resulting in poor performance of the software system overall. Further, while cloud systems can scale-up (increase) computing resources to handle heavier workloads, scaling has limitations (i.e., is not infinite). Consequently, inefficient distribution of tasks can result in inefficient use of computing resources, which can result in scaling that would not otherwise be required.

In view of the above context, implementations of the present disclosure provide an adaptive high-performance task distribution for efficient management of computing resources in cloud systems. As described in further detail herein, the adaptive high-performance task distribution of the present disclosure provides dynamic distribution of tasks to limited computing resources using a distribution list that is optimized according to respective computing resource sizes. In this manner, and among other technical advantages discussed herein, performance of task execution is improved in cloud systems relative to traditional approaches. Implementations of the present disclosure address multiple scenarios. A first scenario includes cloud systems having computing resources of different sizes available. A second scenario includes cloud systems having one size of computing resource available.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can represent a cloud system that includes computing resources for execution of tasks of workloads. In some examples, the cloud system can include computing resources of different sizes (e.g., the first scenario). In some examples, the cloud system can include computing resources of one size (e.g., the second scenario). In some examples, a size of a computing resource is determined based on a number of central processing units (CPUs) and a size of memory that the computing resource has. For example, a first size (small) can include 2 CPUs and 8 GB of memory, a second size (medium) can include 8 CPUs and 64 GB of memory, a third size (large) can include 16 CPUs and 256 GB of memory, and a fourth size (extra-large) can include 32 CPUs and 512 GB of memory. While example sizes of computing resources are discussed herein, it is contemplated that implementations of the present disclosure can be realized with any appropriate size of computing resource.

As described in further detail herein, implementations of the present disclosure schedule tasks for execution on computing resources. In some examples, a task is part of a workload that is performed to support, for example, operations of an enterprise. Example workloads can include, without limitation, generating payroll details for employees, calculating statistics representing global facility cost, and calculating statistics of resource usage within the cloud system. While example workloads and tasks are referred to herein, it is contemplated that implementations of the present disclosure can be realized with any appropriate workload and/or task executed in cloud systems. In the context of the present disclosure, tasks are scheduled in that a task is executed at respective periods (e.g., daily, weekly, monthly). For example, for generating payroll details, a set of tasks can be executed bi-weekly. As another example, for calculating statistics of resource usage within the cloud system, a set of tasks can be executed daily. Execution of a task implicates specific computing resource consumption within a cloud system. Execution of tasks that are scheduled implicates scheduled computing resource consumption within the cloud system.

In view of this, implementations of the present disclosure assign a task execution tag, also referred to as tag herein, to each task in a set of tasks that are to be executed. Each tag is used to schedule a respective task for execution by a computing resource. In some examples, a tag can be described as a recording of information that can be used to schedule a task. For example, a tag can be provided as a notation of task execution time and size of a computing resource that is to execute the task that the tag is assigned to. An example notation for a tag is provided as:

$$T_x^m \rightarrow \frac{t_x}{[S_m, M_m]}$$

where $t_x$ is the task execution time of the $x^{th}$ task, $S_m$ is the number of CPU cores of the $m^{th}$ computing resource and an average consumption rate, and $M_m$ is the size of memory of the $m^{th}$ computing resource and an average consumption rate. In the first scenario, m is greater than 1 and, in the second scenario, m is equal to 1. An example tag can be provided as, without limitation:

$$T_1^{4-16} \rightarrow \frac{100s}{[(4, 30\%), (16, 85\%)]}$$

which indicates a task ($T_1$) that is to be executed on a computing resource of size 4-16 (i.e., 4 CPU cores, 16 GB of memory) and that has a task execution time of 100 seconds, an average CPU consumption rate of 30%, and average memory consumption rate of 85%.

In accordance with implementations of the present disclosure, a task execution tag processor, also referred to as tag processor herein, assigns a tag to each task and records each tag for respective sizes of computing resources. For example, the tag processor can maintain an index of tasks to computing resources and respective tag information for each. The following non-limiting example can be considered:

TABLE 1

| | Example Tag Index | | | | |
| --- | --- | --- | --- | --- | --- |
| Task | Resource 1 [C, M, C %, M %] | Resource 2 [C, M, C %, M %] | Resource 3 [C, M, C %, M %] | ... | Resource m [C, M, C %, M %] |
| $T_1$ | [4, 16, 20, 88] | | | ... | |
| $T_2$ | | [4, 32, 92, 10] | | ... | |
| $T_3$ | | | [8, 32, 33, 50] | ... | |
| ... | | | | ... | |
| $T_n$ | | | | ... | |

In some implementations, tagged tasks are provided to a task scheduler that schedules tasks for execution on respective computing resources based on tags assigned thereto. In some examples, the task scheduler schedules the tasks to the available computing resources based on the tags. As described in further detail herein, the task scheduler optimizes tasks execution across computing resources with an optimization target of the execution time of each computing resource being as close as possible. That is, the tasks are scheduled in an effort to minimize a time between a time that a first task completes and a time that a last task completes. Ultimately, over iterations of execution of the set of tasks, the optimization target is for all tasks to end at the same time or substantially the same time. In some examples, substantially the same time means that the computing resources complete execution of the respective tasks within a threshold period of time relative to each other. That is, for example, a time difference between a time that a first task completes and a time that a last task completes being below a threshold time.

As described in further detail herein, after execution of the set of tasks actual execution times are determined and provided to the tag processer. In a next iteration of execution of the set of tasks, the actual execution times are used to determine sizes of computing resources to execute respective tasks and assign appropriate tags to the respective tasks. The actual execution times provide feedback that is used to improve accuracy in scheduling tasks to respective computing resources. Across each iteration, the execution time of each computing resource ending at the same time or substantially the same time is incrementally achieved.

Implementations of the present disclosure are described in detail with reference to example tasks, example computing resources, example tasks execution times, and the like. It is contemplated, however, that implementations of the present disclosure can be realized with any appropriate tasks, computing resources, task execution times, etc.

By way of non-limiting example, a set of tasks can include eight tasks that are scheduled to execute periodically (e.g., daily, weekly, monthly) $(T_1, T_2, \ldots, T_8)$ on three different sizes of computing resources (e.g., small, medium, large) (first scenario). For example, the set of tasks are part of one or more workloads that are periodically executed. In some examples, an initial partial time estimation can be determined and can be provided as:

TABLE 2

Example Initial Partial Time Estimation

|  | Task Execution Time (s) | | |
|---|---|---|---|
| Task | Small | Medium | Large |
| 1 | 30 | | |
| 2 | | 60 | |
| 3 | | | 5 |
| 4 | | | 30 |
| 5 | 100 | | |
| 6 | | | 40 |
| 7 | | 10 | |
| 8 | | 30 | |

In some examples, the task execution times of Table 2 are provided from historical data and, as such, are known task execution times for the respective task and computing resource size pair. For example, the tag processor can access a log that records task execution times of each task on one or more computing resource sizes.

In the example of Table 2, while task execution times are known for each task and respective size of computing resource, task execution times are absent for each task and other sizes of computing resources. For example, and with reference to Table 2, task execution times are absent for tasks 2, 3, 4, 6, 7, and 8 for the small size computing resource. In view of this, initial time estimations can be determined for each task and each of the other sizes of computing resources.

In some implementations, the tag processor provides task execution time estimates by selecting one of the CPU and the memory as a bottleneck parameter, then calculating a scaling factor for another size resource, and applying the scaling factor to the (known) task execution time to determine the task execution time estimate for the other computing resource. In some examples, a first scaling factor $(f_1)$ is provided to be used for estimating task execution time when the current computing resource size (i.e., the computing resource size that the known task execution time is provided for) is smaller than the next computing resource size (i.e., the computing resource size that a task execution time is to be estimated for). In some examples, a second scaling factor $(f_2)$ is provided to be used for estimating task execution time when the current computing resource is larger than the next computing resource.

In some examples, the first scaling factor is determined based on the following example relationship:

$$f_1 = \begin{cases} r_1, \text{ for } P_{bottle} > V_{thr} \\ 1, \text{ for } P_{bottle} < V_{thr} \end{cases}$$

where $P_{bottle}$ is the value of the bottleneck parameter, $r_1$ is a ratio of a size of the current computing resource to a size of the next (larger) computing resource, and $V_{thr}$ is a threshold value (e.g., 80%). The execution time for the current computing source is multiplied by the scaling factor to determine the estimated execution time for the next (larger) computing resource.

In some examples, the second scaling factor is determined based on the following example relationship:

$$f_2 = \text{MAX}\left[\frac{P_{bottle}}{r_2}, 1\right]$$

where $P_{bottle}$ is the value of the bottleneck parameter, and $r_2$ is a ratio of a size of the next (smaller) computing resource to a size of the current computing resource. Accordingly, the second scaling factor will at least be equal to 1. The execution time for the current computing source is multiplied by the scaling factor to determine the estimated execution time for the next (smaller) computing resource.

In some examples, for the current computing source size, the parameter that has the highest value is taken as the bottleneck parameter. For example, if the average CPU consumption is greater than the average memory consumption, then the average CPU consumption is taken as the bottleneck parameter. As another example, if the average CPU consumption is less than the average memory consumption, then the average memory consumption is taken as the bottleneck parameter.

Estimating execution times is described in further detail by way of non-limiting examples. In these examples, three sizes of computing resources are considered and include a first size of 2 CPUs and 8 GB of memory, a second size of 8 CPUs and 64 GB of memory, and a third size of 16 CPUs and 256 GB of memory.

In a first example, a task can have a (known) task execution time of 20 seconds on a computing resource of the second size with an average CPU consumption of 85% and an average memory consumption of 60%. In this example, the average CPU consumption is taken as the bottleneck parameter, because it is greater than the average memory consumption. Further, the average CPU consumption is greater than 80%. To determine the first scaling factor for the third size of computing resource, the first scaling factor is calculated as:

$$f_1 = \frac{8}{16} = 0.5$$

Consequently, for the third size computing resource, the task execution time of the task is estimated to be 10 seconds (i.e., 20×0.5). To determine the second scaling factor for the first size of computing resource, the second scaling factor is calculated as:

$$f_2 = \text{MAX}\left[\frac{0.85}{\frac{2}{8}}, 1\right] = 3.4$$

Consequently, for the first size computing resource, the task execution time of the task is estimated to be 68 seconds (i.e., 20×3.4).

In a second example, a task can have a (known) task execution time of 30 seconds on a computing resource of the second size with an average CPU consumption of 40% and an average memory consumption of 60%. In this example, the average memory consumption is taken as the bottleneck parameter, because it is greater than the average CPU consumption. Further, the average memory consumption is less than 80%. To determine the first scaling factor for the third size of computing resource, the first scaling factor is calculated as:

$$f_1 = 1$$

because the average memory consumption is less than 80%. Consequently, for the third size computing resource, the task execution time of the task is estimated to be 20 seconds (i.e., 20×1). To determine the second scaling factor for the first size of computing resource, the second scaling factor is calculated as:

$$f_2 = \text{MAX}\left[\frac{0.60}{\frac{2}{8}}, 1\right] = 2.4$$

Consequently, for the first size computing resource, the task execution time of the task is estimated to be 48 seconds (i.e., 20×2.4).

Continuing with the example of Table 2, the following example initial time estimations can be provided:

TABLE 3

Example Initial Time Estimation

| Task | Task Execution Time (s) | | |
|---|---|---|---|
| | Small | Medium | Large |
| 1 | 30 | 20 | 10 |
| 2 | 80 | 60 | 30 |
| 3 | 15 | 10 | 5 |
| 4 | 30 | 30 | 30 |
| 5 | 100 | 60 | 30 |
| 6 | 80 | 50 | 40 |
| 7 | 10 | 10 | 10 |
| 8 | 60 | 30 | 20 |

In the example of Table 3, the bolded values are the originally provided values (known task execution times) for the respective pairs of task and computing resource size, and the non-bolded values are determined estimates (estimated task execution times).

For an initial execution of the set of tasks (e.g., the first execution of the schedule), the initial time estimation is used by the task processor to assign tags to the respective tasks. In some examples, and as discussed above, the task processor assigns tags with a goal of the execution of tasks on each size of computing resource being completed as closely as possible. Continuing with the example above, the tag processor can assign tags as:

TABLE 4

Example Tag Assignments

| | Tags | | |
|---|---|---|---|
| Task | Small | Medium | Large |
| 1 | $T_1{}^{SMALL}$ (30 s) | | |
| 2 | | | $T_2{}^{LRG}$ (30 s) |
| 3 | | | $T_3{}^{LRG}$ (5 s) |
| 4 | $T_4{}^{SMALL}$ (30 s) | | |
| 5 | | | $T_5{}^{LRG}$ (30 s) |
| 6 | | $T_6{}^{MED}$ (50 s) | |
| 7 | $T_7{}^{SMALL}$ (10 s) | | |
| 8 | | $T_8{}^{MED}$ (30 s) | |
| Estimated Time | 70 s | 80 s | 65 s |

As noted above, the tag processor assigns tags to tasks in an effort to have the execution of all tasks across all computing resources as close to completing at the same time as possible. In the example of Table 4, this is achieved with moderate success (e.g., 15 second difference between first and last) given the initial information that is available for the task execution times across all pairs of tasks and computing resource sizes (i.e., known task execution times and estimated task execution times).

In some examples, the tag processor provides the set of tasks, each task with a respective tag assigned thereto, to the task scheduler. The task scheduler schedules tasks for execution based on respective tags. For example, in response to a tag indicating that a task is to be executed on a particular size of computing resource, the task is scheduled, by the task scheduler, for execution on a computing resource of the particular size. Continuing with the example above, the task scheduler can schedule the tasks as follows:

TABLE 5

Example Schedule

| Computing Resource Size | Tasks |
|---|---|
| Small | 1, 4, 7 |
| Medium | 6, 8 |
| Large | 2, 3, 5 |

In some implementations, the task scheduler schedules a task on a particular computing resource of the designated size. In some examples, the computing resource can be selected based on the average CPU consumption and/or the average memory consumption indicated for a respective task in the tag. For example, the example tag, introduced above, can be considered:

$$T_1^{4\text{-}16} \rightarrow \frac{100s}{[(4, 30\%), (16, 85\%)]}$$

Here, the computing resource size is provided as 4-16 (i.e., 4 CPU cores, 16 GB memory) with an average CPU consumption of 30% and an average memory consumption of 85% for the task. The task scheduler can determine that multiple computing resources of size 4-16 are available and, for each such computing resource, determine a CPU consumption and a memory consumption. For example, the task scheduler can access a log that tracks each computing resource within a cloud system, and, or each computing resource, a size, a CPU consumption (e.g., current CPU consumption), and a memory consumption (e.g., current memory consumption).

For each task, the task scheduler can select a computing resource that corresponds to the size indicated in the respective tag, as well as having resources available to execute the task. For example, and without limitation, the task scheduler can determine (e.g., from the log) that the cloud system includes a first computing resource and a second computing resource of the size 4-16. The first computing resource can include a CPU consumption of 80% and a memory consumption of 60%, and the second computing resource can include a CPU consumption of 20% and a memory consumption of 10%. Consequently, the task scheduler can schedule the task for execution on the second computing resource.

After identifying computing resources for each task, the task scheduler can dispatch the tasks for execution on identified computing resources. For example, the task scheduler transmits a task request for a respective task to the computing resource identified for the respective task. In some examples, the task request includes a task payload that can include instructions and/or data that are to be processed by the computing resource to execute the task. In some examples, the task request also provides instructions that a task execution time for execution of the task is to be provided. For example, the computing resource can be instructed to return the task execution time it actually took to execute the task to the tag processor.

After execution of each task, the tag processor receives a task execution time for each task (e.g., from the respective computing resources). Each task execution time that is received represents an actual time expended to execute the task on a respective computing resource. Continuing with the example above, the following example task execution times can be provided:

TABLE 6

Example Updated Partial Time Estimation

| | Task Execution Time (s) | | |
| Task | Small | Medium | Large |
| 1 | 30 | | |
| 2 | | 60 | *28* |
| 3 | | | 5 |
| 4 | *35* | | 30 |
| 5 | 100 | | *37* |
| 6 | | 40 | 40 |
| 7 | *15* | 10 | |
| 8 | | 30 | |

In the example of Table 6, the bolded values are the originally provided values (known task execution times) for the respective pairs of task and computing resource size, and the italicized values indicate task times returned for respective pairs of task and computing resource size. Accordingly, the original task execution times and the returned task execution times provide an updated schedule of task execution times. That is, for example, Table 6 is an update to Table 2.

In accordance with implementations of the present disclosure, for a next iteration of execution of the set of tasks, the updated schedule of task execution times is referenced. For example, the tag processor accesses the updated schedule. In the updated schedule, while task execution times are known for each task and respective size of computing resource, task execution times are absent for each task and other sizes of computing resources. For example, and with reference to Table 6, task execution times are absent for tasks 2, 3, 6, and 8 for the small size computing resource. In view of this, next time estimations can be determined for each task and each of the other sizes of computing resources.

In view of this, and as described above with reference to Tables 2 and 3, time estimations can be provided. Continuing with the examples above, the following example initial time estimations can be provided:

TABLE 7

Example Updated Time Estimation

| | Task Execution Time (s) | | |
| Task | Small | Medium | Large |
| 1 | 30 | 20 | 10 |
| 2 | 90 | 60 | *28* |
| 3 | 15 | 10 | 5 |
| 4 | *35* | 32 | 30 |
| 5 | 100 | 66 | *37* |
| 6 | 60 | 40 | 40 |
| 7 | *15* | 10 | 8 |
| 8 | 60 | 30 | 20 |

Here, the non-bolded, non-italicized are determined estimated task execution times.

For a next execution of the set of tasks (e.g., the second execution of the schedule), the updated time estimation is used by the task processor to assign tags to the respective tasks. In some examples, and as discussed above, the task processor assigns tags with a goal of the execution of tasks on each size of computing resource being completed at substantially the same time. The tag processor provides the set of tasks, each task assigned a respective tag, to the task scheduler. The task scheduler schedules tasks for execution based on respective tags, as described herein. After identifying computing resources for each task, the task scheduler can dispatch the tasks for execution on identified computing resources. After execution of each task, the tag processor receives a task execution time for each task (e.g., from the respective computing resources), which can be used to provide updated time estimations, as described herein. The updated time estimations can then be used in a next iteration of the schedule.

In some implementations, the above-described process is executed over iterations of execution of the set of tasks until an end condition is achieved. An example end condition can include a schedule that results in each of the computing resources executing its assigned tasks at substantially the same time. Here, substantially the same time means that the computing resources complete execution of the respective tasks within a threshold period of time relative to each other (e.g., the last computing resource completes execution within X milliseconds of the first computing resource to complete its execution).

Figure 2A:
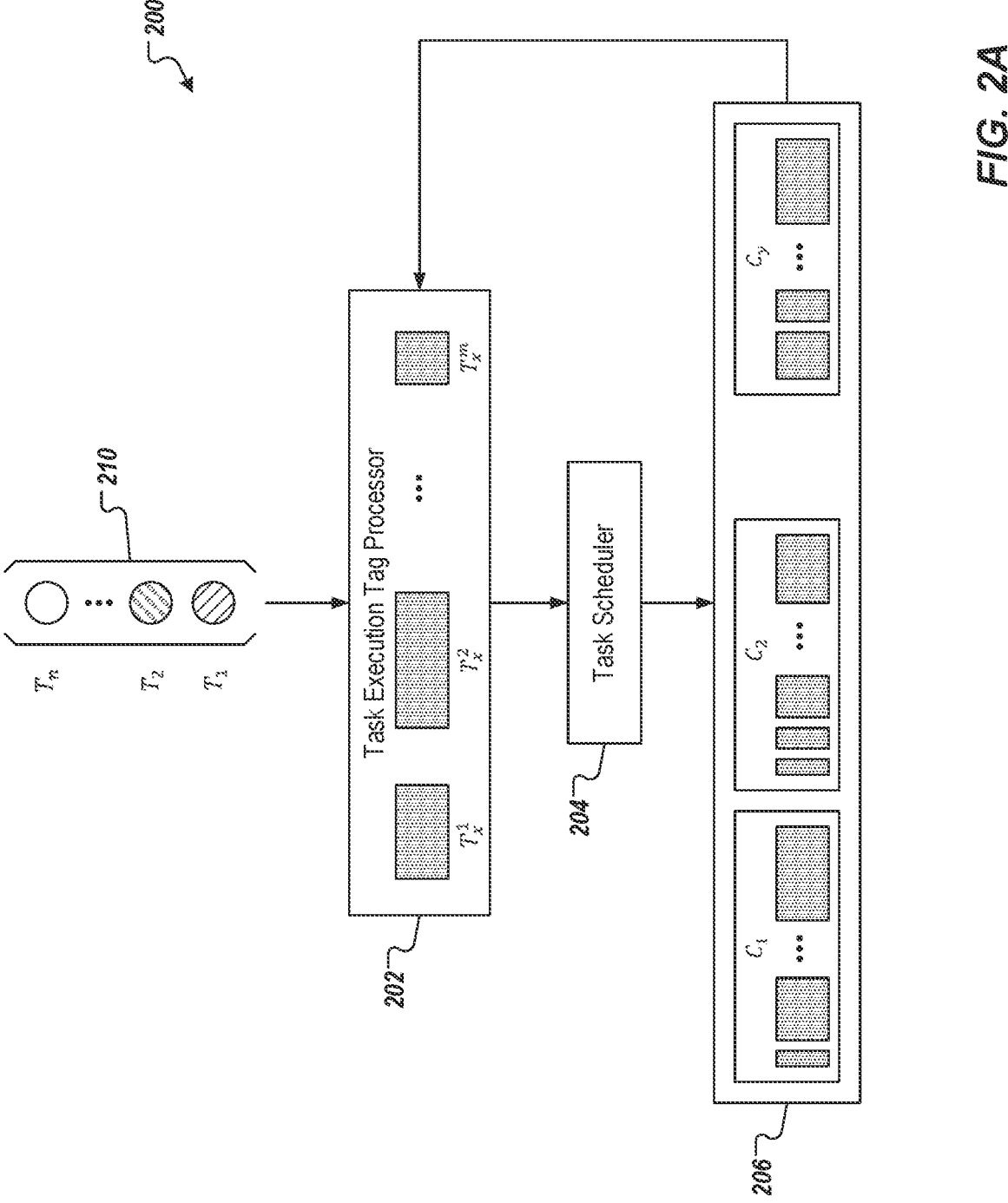
FIG. 2A depicts an example conceptual architecture in accordance with implementations of the present disclosure.

FIG. 2A depicts an example conceptual architecture 200 in accordance with implementations of the present disclosure. In the depicted example, the example conceptual architecture 200 includes a task execution tag processor 202, also referred to as tag processor 202 herein, a task scheduler 204, and a set of computing resources 206 ($C_1, C_2, \ldots, C_y$). The example of FIG. 2A represents a scenario, in which computing resources in the set of computing resources 206 are of various sizes (the first scenario). In some examples, the tag processor 202 and/or the task scheduler 204 are each executed as one or more services (microservices) within a cloud system (e.g., SAP HANA Cloud). In some examples, each computing resource in the set of computing resources

206 is a physical device within the cloud system having a set of hardware parameters that can include, without limitation, number of CPU cores and memory size.

In accordance with implementations of the present disclosure, the tag processor 202 receives a set of tasks 210 ($T_1$, $T_2$, ..., $T_n$) that are to be executed by the set of computing resources 206. In some examples, the set of tasks are scheduled in that they are periodically executed (e.g., daily, weekly, monthly). As described herein, each task in the set of tasks 210 is assigned a tag indicating a respective size of resource that the task is to be executed by. In some examples, the tag processor 202 assigns tags to the set of tasks 210 based on known execution times and estimated execution times, as described herein with non-limiting reference to Tables 2 to 4. The task scheduler 204 receives the set of tasks and associated tasks and schedules tasks for execution on computing resources in the set of computing resources. After execution of its task(s), each of the computing resources provides an actual execution time for each task executed to the tag processor 202. In this manner, the tag processor 202 can selectively update estimates of task estimation times for a subsequent iteration of execution of the set of tasks.

Figure 2B:
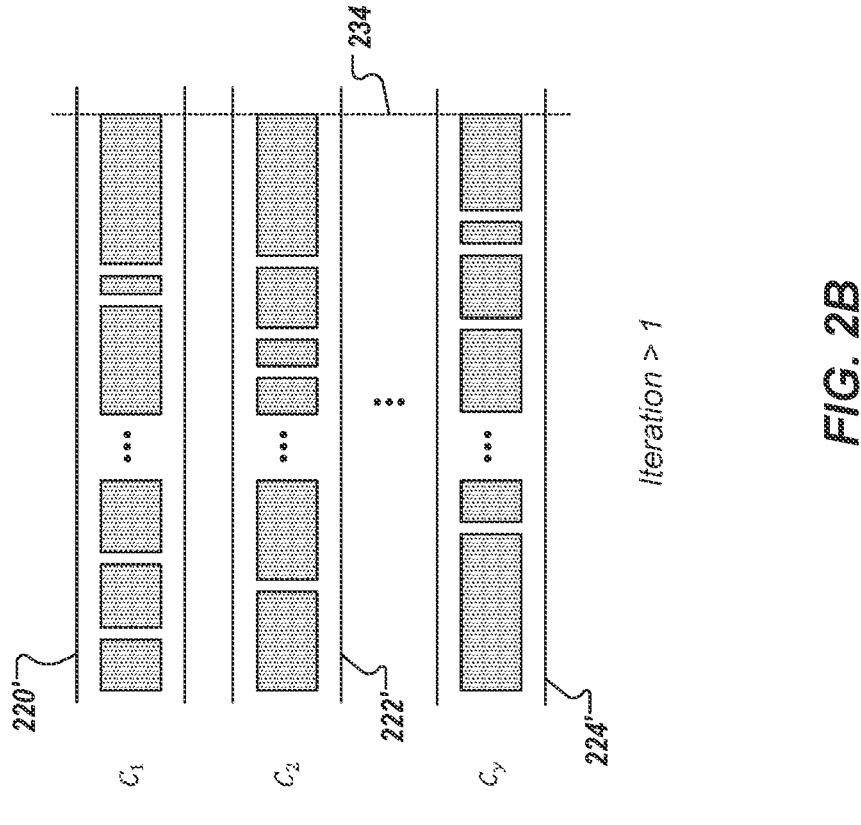
FIG. 2B depicts example task queues in accordance with implementations of the present disclosure.
Figure 2B:
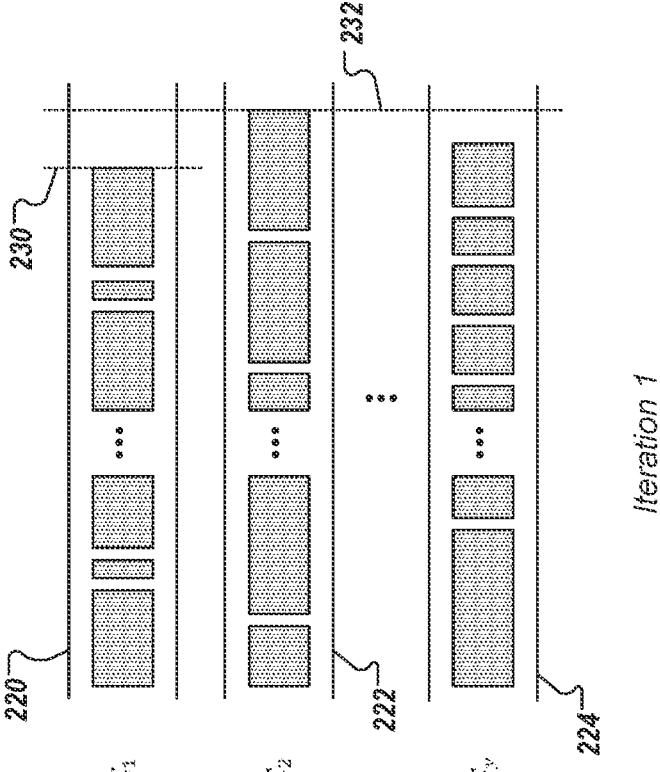

FIG. 2B depicts example task queues 220, 222, 224; 220', 222', 224' for respective iterations of execution of a set of tasks in accordance with implementations of the present disclosure. In the example of FIG. 2B, a first iteration (Iteration 1) includes the tasks queues 220, 222, 224 corresponding to respective computing resources $C_1$, $C_2$, ..., $C_y$. In some examples, the first iteration can represent an initial execution of the set of tasks. In the example of FIG. 2B, the computing resource $C_1$ completes execution of tasks at a first time 230 and the computing resource $C_2$ is the last computing resource to complete at a second time 232. It can be determined that a difference between the first time 230 and the second time 232 is greater than a threshold difference. Consequently, it is determined that updated task execution time estimates will be used in a subsequent iteration of execution of the set of tasks (e.g., as described herein with non-limiting reference to Tables 6 and 7).

In FIG. 2B, the task queues 220', 222', 224' represent a subsequent (relative to the first iteration) execution of the set of tasks. In this example, each of the computing resources $C_1$, $C_2$, ..., $C_y$ completes execution of its respective task queue at or substantially at a third time 234 (e.g., all of the computing resources $C_1$, $C_2$, ..., $C_y$ complete execution within X milliseconds of the third time 234). In some examples, it can be determined that no further iterations of updating task execution time estimates is required.

Figure 3:
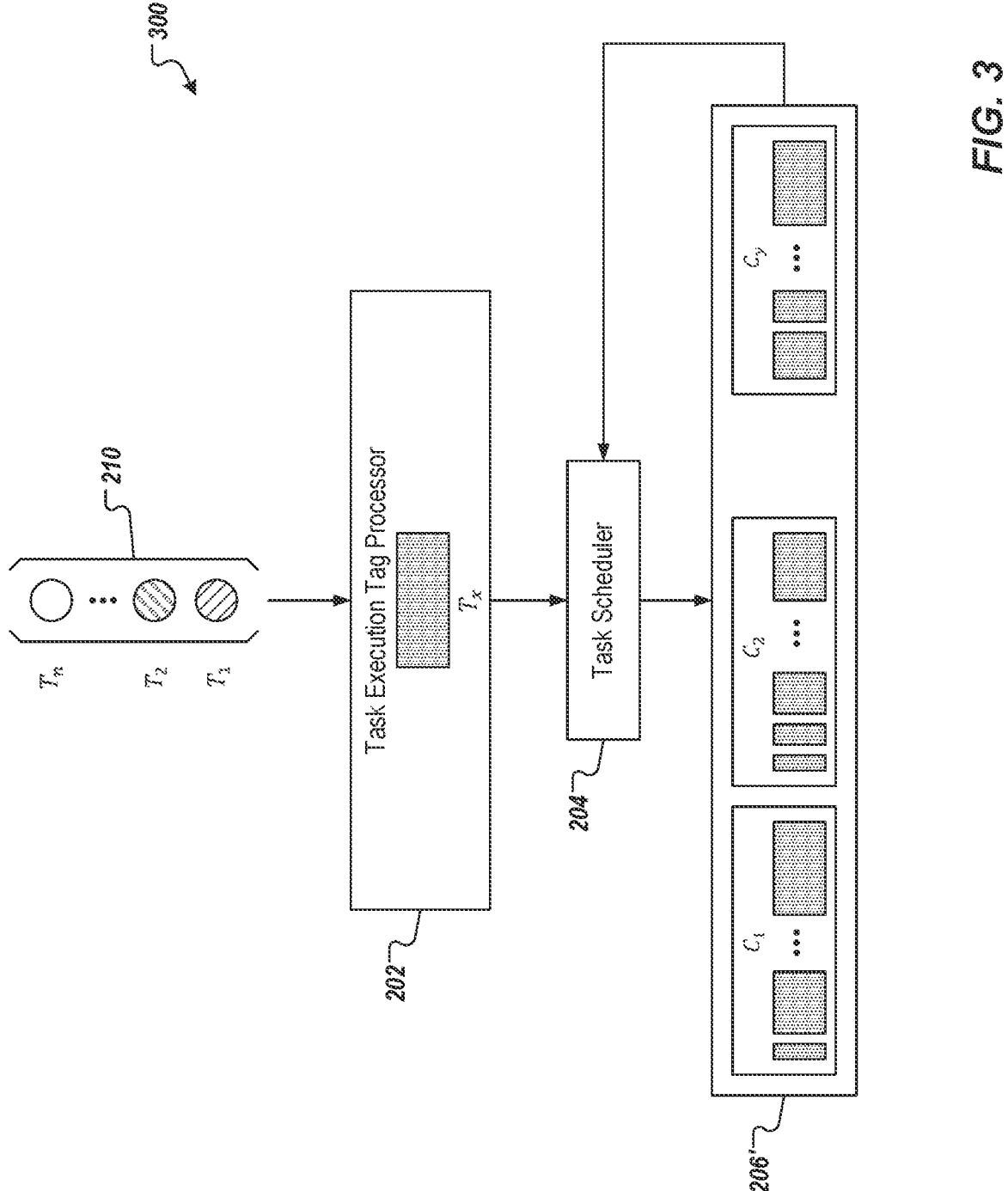
FIG. 3 depicts an example conceptual architecture in accordance with implementations of the present disclosure.

FIG. 3 depicts an example conceptual architecture 300 in accordance with implementations of the present disclosure. In the depicted example, the example conceptual architecture 300 includes the task execution tag processor 202, also referred to as tag processor 202 herein, the task scheduler 204, and a set of computing resources 206' ($C_1$, $C_2$, ..., $C_y$). The example of FIG. 3 represents a scenario, in which computing resources in the set of computing resources 206' are of the same size (the second scenario).

In accordance with implementations of the present disclosure, the tag processor 202 receives the set of tasks 210 ($T_1$, $T_2$, ..., $T_n$) that are to be executed by the set of computing resources 206. In some examples, the set of tasks are scheduled in that they are periodically executed (e.g., daily, weekly, monthly). As described herein, each task in the set of tasks 210 is assigned a tag indicating a computing resource that the task is to be executed by. The task scheduler 204 receives the set of tasks and associated tasks and schedules tasks for execution on computing resources in the set of computing resources. After execution of its task(s), each of the computing resources provides an actual execution time for each task executed to the tag processor 202. In this manner, the tag processor 202 can selectively update estimates of task estimation times for a subsequent iteration of execution of the set of tasks.

As introduced above, computing resources in the set of computing resources can each be of the same size (the second scenario). In some examples, all of the tasks are distributed sequentially in cases where the computing resources are all of the same size. After a first round of execution, each task's execution time is known. The tag processor directly generates the tag for every task, but estimation is omitted because there are no other types of resources to consider. In a subsequent round of execution, the task scheduler schedules tasks for execution based on respective tags and to ensure that the total execution time is the shortest among all different possible combinations. Because all tags have been recorded, when other types (sizes) of resources join the accessible computing resource pool, the tag processor will do the estimation as described above (the first scenario).

Figure 4:
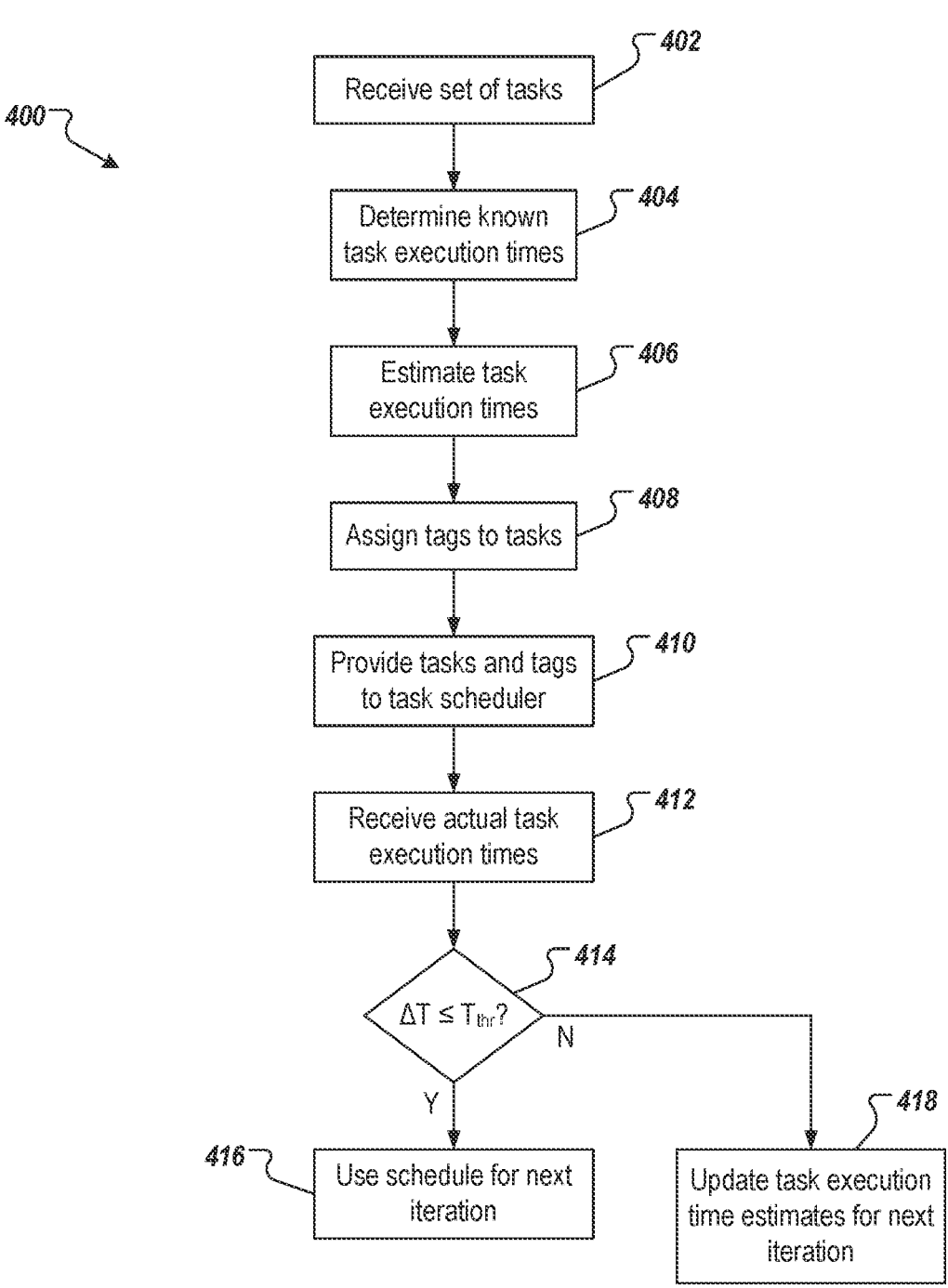
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

A set of tasks is received (402). For example, and as described herein with reference to FIGS. 2A and 3, the tag processor 202 receives the set of tasks 210. Known task execution times are determined (404). For example, and as described herein, the tag processor determines known task execution times (e.g., from a log) for tasks in the set of tasks 210. In some examples, the known task execution times are for respective sizes of computing resources that have executed respective tasks. Task execution times are estimated (406). For example, and as described herein, the tag processor 202 estimates tasks execution times for tasks on size of computing resources that known task execution times are unavailable for (e.g., as discussed herein with reference to Table 3).

Tags are assigned to tasks (408). For example, and as described herein, the tag processor assigns tags to tasks with the goal of the execution of tasks on each size of computing resource being completed as closely as possible. Each tag represents a size of computing resource that a respective task is to be executed on. Tasks and tags are provided to task scheduler (410). For example, and as described herein, the tag processor 202 provides the set of tasks and respective tags to the task scheduler 204. The task scheduler 204 can select a computing resource that corresponds to the size indicated in the respective tag, as well as having resources available to execute the task. After identifying computing resources for each task, the task scheduler 204 can dispatch the tasks for execution on identified computing resources.

Actual task execution times are received (412). For example, and as described herein, each computing resource provides an actual execution time for respective tasks that the computing resource executed. The actual task execution times are received by the tag processor 202. It is determined whether a time difference ($\Delta T$) is less than or equal to a threshold time ($T_{thr}$) (414). For example, and as described herein, the time difference between a first computing resource completing execution of its assigned tasks and a last computing resource completing execution of its assigned tasks is determined and is compared to the threshold time difference. If the time difference (ΔT) is less than or equal to the threshold time ($T_{thr}$), the schedule for the last iteration is used for the next iteration (416). For example, and as described herein, in a next iteration of execution of the set of tasks, the tag processor 202 assigns the same tags to the tasks in the set of tasks as assigned in the last iteration. If the time difference (ΔT) is not less than or equal to the threshold time ($T_{thr}$), task execution time estimates are updated for the next iteration (418). For example, and as described herein, the known task execution times and the actual task execution times are used to update estimated task execution times in a next iteration of execution of the set of tasks.

Figure 5:
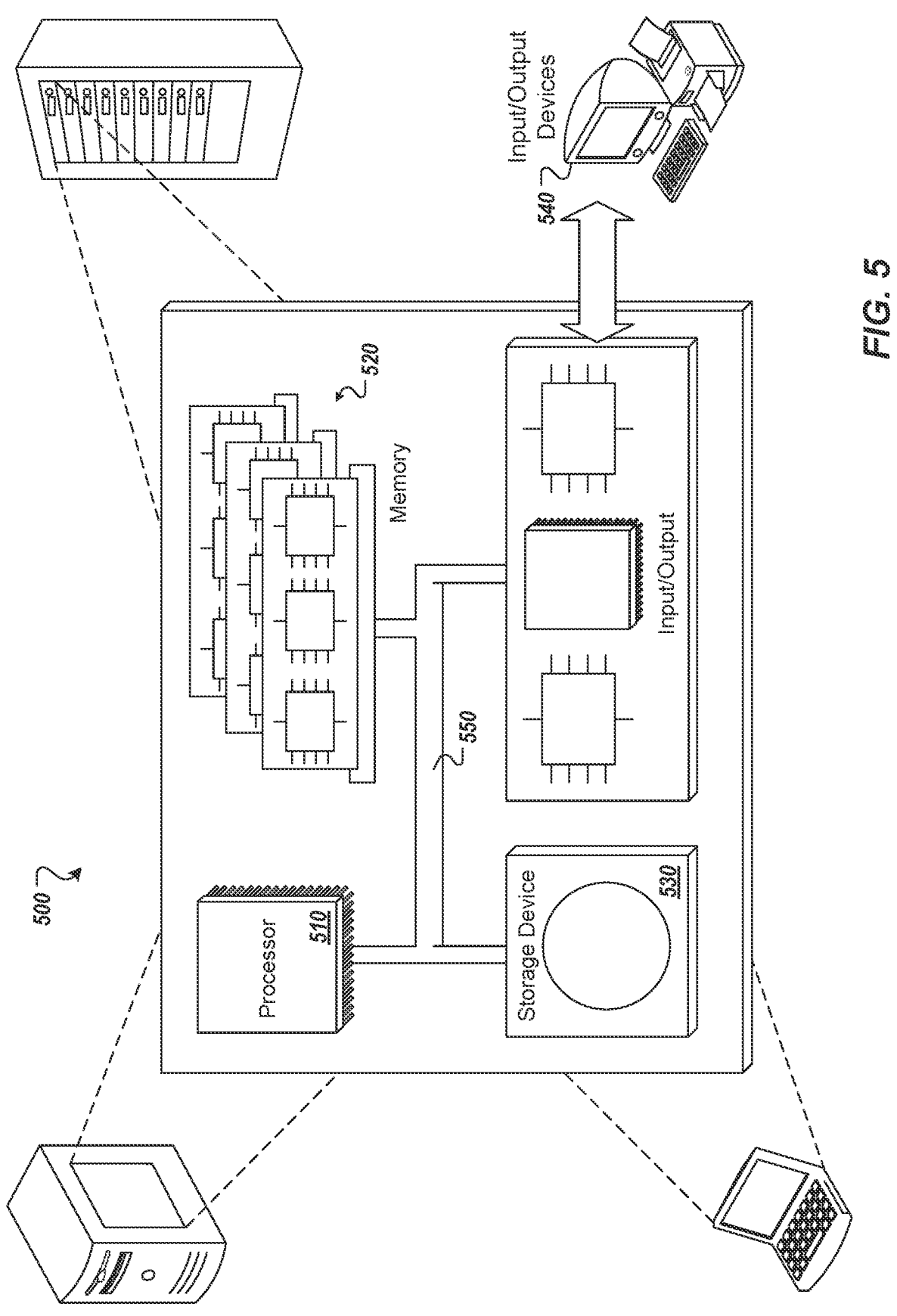
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for scheduling tasks of a set of tasks for execution by computing resources in a cloud system, the method being executed by one or more processors and comprising:

receiving, by a tag processor executed within the cloud system, a set of task execution times, each task execution time corresponding to a task and computing resource pair, each task and computing resource pair representing a computing resource size in a set of computing resource sizes, each computing resource size in the set of computing resource sizes comprising a number of central processing unit (CPU) cores and a size of memory;

determining, by the tag processor, a set of estimated task execution times based on the set of task execution times, each estimated task execution time being calculated by:

selecting one of an average CPU consumption and an average memory consumption as a bottleneck parameter for a computing resource size that is different than a computing resource size of a corresponding task execution time in the set of task execution times, determining a scaling factor using the bottleneck parameter, the scaling factor comprising a task execution time scaling factor to scale task execution times and comprising one of:

a first scaling factor determined based on a threshold value in response to a current computing resource size being smaller than a next computing resource size, and a second scaling factor determined as a maximum of multiple values in response to the current computing resource size being larger than the next computing resource size, and multiplying the corresponding task execution time by the scaling factor to determine a corresponding estimated task execution time;

assigning, by the tag processor, a tag to each task in the set of tasks, each tag indicating a computing resource size that the respective tasks is to be executed by;

providing, by the tag processor, the set of tasks and assigned tags to a task scheduler for execution of the set of tasks in an iteration within the cloud system, the task scheduler transmitting the tasks to computing resources, the computing resources executing the tasks the task scheduler sending a first task assigned with a first tag to a computing resource of a first size, and sending a second task assigned with a second tag to a computing resource of a second size; and receiving, by the tag processor, actual task execution times from the computing resources, each actual task execution time indicating an actual time required by a respective computing resource to execute a respective task.

2. The method of claim 1, further comprising:

determining, by the tag processor, a set of updated estimated task execution times based on the set of task execution times and the actual task execution times;

assigning, by the tag processor, a tag to each task in the set of tasks based on the set of updated estimated task execution times; and providing, by the tag processor, the set of tasks and assigned tags to the task scheduler for execution of the set of tasks in a subsequent iteration within the cloud system.

3. The method of claim 1, wherein determining a set of estimated task execution times based on the set of task execution times comprises determining a scaling factor to be applied to a task execution time in the set of task execution times, the task execution time being multiplied by the scaling factor to determine an estimated task execution time in the set of estimated task execution times.

4. The method of claim 3, wherein the scaling factor is based on a computing resource size that the estimated task execution time is calculated for.

5. The method of claim 3, wherein the scaling factor is greater than or equal to 1.

6. The method of claim 1, wherein tags are assigned to minimize a difference between a first completion time corresponding to a first computing resource and a last completion time corresponding to a second computing resource.

7. The method of claim 1, further comprising:

determining that a first completion time corresponding to a first computing resource and a last completion time corresponding to a second computing resource are within a threshold time of each other and, in response, foregoing updating of estimated task execution times in a subsequent iteration of execution of the set of tasks.

8. A non-transitory computer-readable storage medium coupled to one or more processors and having instructions stored thereon which, when executed by the one or more processors, cause the one or more processors to perform operations for scheduling tasks of a set of tasks for execution by computing resources in a cloud system, the operations comprising:

receiving, by a tag processor executed within the cloud system, a set of task execution times, each task execution time corresponding to a task and computing resource pair, each task and computing resource pair representing a computing resource size in a set of computing resource sizes, each computing resource size in the set of computing resource sizes comprising a number of central processing unit (CPU) cores and a size of memory;

determining, by the tag processor, a set of estimated task execution times based on the set of task execution times, each estimated task execution time being calculated by:

selecting one of an average CPU consumption and an average memory consumption as a bottleneck parameter for a computing resource size that is different than a computing resource size of a corresponding task execution time in the set of task execution times, determining a scaling factor using the bottleneck parameter, the scaling factor comprising a task execution time scaling factor to scale task execution times and comprising one of:

a first scaling factor determined based on a threshold value in response to a current computing resource size being smaller than a next computing resource size, and a second scaling factor determined as a maximum of multiple values in response to the current computing resource size being larger than the next computing resource size, and multiplying the corresponding task execution time by the scaling factor to determine a corresponding estimated task execution time;

assigning, by the tag processor, a tag to each task in the set of tasks, each tag indicating a computing resource size that the respective tasks is to be executed by;

providing, by the tag processor, the set of tasks and assigned tags to a task scheduler for execution of the set of tasks in an iteration within the cloud system, the task scheduler transmitting the tasks to computing resources, the computing resources executing the tasks, the task scheduler sending a first task assigned with a first tag to a computing resource of a first size, and sending a second task assigned with a second tag to a computing resource of a second size; and receiving, by the tag processor, actual task execution times from the computing resources, each actual task execution time indicating an actual time required by a respective computing resource to execute a respective task.

9. The non-transitory computer-readable storage medium of claim 8, wherein operations further comprise:

determining, by the tag processor, a set of updated estimated task execution times based on the set of task execution times and the actual task execution times;

assigning, by the tag processor, a tag to each task in the set of tasks based on the set of updated estimated task execution times; and providing, by the tag processor, the set of tasks and assigned tags to the task scheduler for execution of the set of tasks in a subsequent iteration within the cloud system.

10. The non-transitory computer-readable storage medium of claim 8, wherein determining a set of estimated task execution times based on the set of task execution times comprises determining a scaling factor to be applied to a task execution time in the set of task execution times, the task execution time being multiplied by the scaling factor to determine an estimated task execution time in the set of estimated task execution times.

11. The non-transitory computer-readable storage medium of claim 10, wherein the scaling factor is based on a computing resource size that the estimated task execution time is calculated for.

12. The non-transitory computer-readable storage medium of claim 10, wherein the scaling factor is greater than or equal to 1.

13. The non-transitory computer-readable storage medium of claim 8, wherein tags are assigned to minimize a difference between a first completion time corresponding to a first computing resource and a last completion time corresponding to a second computing resource.

14. The non-transitory computer-readable storage medium of claim 8, wherein operations further comprise:

determining that a first completion time corresponding to a first computing resource and a last completion time corresponding to a second computing resource are within a threshold time of each other and, in response, foregoing updating of estimated task execution times in a subsequent iteration of execution of the set of tasks.

15. A system, comprising:

a hardware computing device; and a non-transitory, hardware computer-readable storage device coupled to the computing device and having instructions stored thereon which, when executed by the computing device, cause the computing device to perform operations for scheduling tasks of a set of tasks for execution by computing resources in a cloud system, the operations comprising:

receiving, by a tag processor executed within the cloud system, a set of task execution times, each task execution time corresponding to a task and computing resource pair, each task and computing resource pair representing a computing resource size in a set of computing resource sizes, each computing resource size in the set of computing resource sizes comprising a number of central processing unit (CPU) cores and a size of memory;

determining, by the tag processor, a set of estimated task execution times based on the set of task execution times, each estimated task execution time being calculated by:

selecting one of an average CPU consumption and an average memory consumption as a bottleneck parameter for a computing resource size that is different than a computing resource size of a corresponding task execution time in the set of task execution times, determining a scaling factor using the bottleneck parameter, the scaling factor comprising a task execution time scaling factor to scale task execution times and comprising one of:

a first scaling factor determined based on a threshold value in response to a current computing resource size being smaller than a next computing resource size, and a second scaling factor determined as a maximum of multiple values in response to the current computing resource size being larger than the next computing resource size, and multiplying the corresponding task execution time by the scaling factor to determine a corresponding estimated task execution time;

assigning, by the tag processor, a tag to each task in the set of tasks, each tag indicating a computing resource size that the respective tasks is to be executed by;

providing, by the tag processor, the set of tasks and assigned tags to a task scheduler for execution of the set of tasks in an iteration within the cloud system, the task scheduler transmitting the tasks to computing resources, the computing resources executing the tasks, the task scheduler sending a first task assigned with a first tag to a computing resource of a first size, and sending a second task assigned with a second tag to a computing resource of a second size; and receiving, by the tag processor, actual task execution times from the computing resources, each actual task execution time indicating an actual time required by a respective computing resource to execute a respective task.

16. The system of claim 15, wherein operations further comprise:

determining, by the tag processor, a set of updated estimated task execution times based on the set of task execution times and the actual task execution times;

assigning, by the tag processor, a tag to each task in the set of tasks based on the set of updated estimated task execution times; and providing, by the tag processor, the set of tasks and assigned tags to the task scheduler for execution of the set of tasks in a subsequent iteration within the cloud system.

17. The system of claim 15, wherein determining a set of estimated task execution times based on the set of task execution times comprises determining a scaling factor to be applied to a task execution time in the set of task execution times, the task execution time being multiplied by the scaling factor to determine an estimated task execution time in the set of estimated task execution times.

18. The system of claim 17, wherein the scaling factor is based on a computing resource size that the estimated task execution time is calculated for.

19. The system of claim 17, wherein the scaling factor is greater than or equal to 1.

20. The system of claim 15, wherein tags are assigned to minimize a difference between a first completion time corresponding to a first computing resource and a last completion time corresponding to a second computing resource.

* * * * *